(12) United States Patent
Boyd

(10) Patent No.: US 6,647,716 B2
(45) Date of Patent: Nov. 18, 2003

(54) OCEAN WAVE POWER GENERATOR (A "MODULAR POWER-PRODUCING NETWORK")

(76) Inventor: Secil Boyd, P.O. Box 427, Holualoa, HI (US) 96725

( * ) Notice: Subject to any disclaimer, the term of this patent is extended or adjusted under 35 U.S.C. 154(b) by 27 days.

(21) Appl. No.: 09/874,460

(22) Filed: Jun. 4, 2001

(65) Prior Publication Data

US 2002/0157398 A1 Oct. 31, 2002

Related U.S. Application Data

(60) Provisional application No. 60/210,578, filed on Jun. 8, 2000.

(51) Int. Cl.[7] ............................................. F16D 31/02
(52) U.S. Cl. ............................ 60/398; 60/413; 417/332
(58) Field of Search ........................ 60/398, 413, 418; 417/332

(56) References Cited

U.S. PATENT DOCUMENTS

| | | | |
|---|---|---|---|
| 3,970,415 A | * 7/1976 | Widecrantz et al. | .......... 60/398 |
| 4,092,828 A | * 6/1978 | Garza | .......... 417/332 |
| 4,152,895 A | 5/1979 | Wirt | |
| 4,241,579 A | 12/1980 | Borgren | |
| 4,389,843 A | 6/1983 | Lamberti | |
| 4,454,429 A | 6/1984 | Buonome | |
| 4,480,966 A | * 11/1984 | Smith | .......... 417/332 |
| 4,539,485 A | 9/1985 | Neuenschwander | |
| 4,560,884 A | 12/1985 | Whittecar | |
| 4,748,338 A | 5/1988 | Boyce | |
| 4,754,157 A | 6/1988 | Windle | |
| 4,781,023 A | 11/1988 | Gordon | |
| 4,803,839 A | 2/1989 | Russo | |
| 4,843,250 A | 6/1989 | Stupakis | |
| 4,851,704 A | 7/1989 | Rubi | |
| 5,027,000 A | 6/1991 | Chino | |
| 5,066,867 A | 11/1991 | Shim | |
| 5,359,229 A | 10/1994 | Youngblood | |
| 5,394,695 A | 3/1995 | Sieber | |
| 5,424,582 A | 6/1995 | Trepl et al. | |
| 5,592,816 A | 1/1997 | Williams | |
| 5,789,826 A | 8/1998 | Kumbatovic | |
| 5,808,368 A | 9/1998 | Brown | |
| 5,854,516 A | 12/1998 | Shim | |
| 5,889,336 A | 3/1999 | Tateishi | |
| 5,955,790 A | 9/1999 | North | |
| 5,986,349 A | 11/1999 | Eberle | |
| 6,388,342 B1 | * 5/2002 | Vetterick et al. | ............... 60/398 |

* cited by examiner

Primary Examiner—Edward K. Look
Assistant Examiner—Michael Leslie

(57) ABSTRACT

Disclosed herein is a compound device (a "modular power-producing network", or "power net") for the purpose of transducing the energy in ocean waves into electrical energy. The invention first pressurizes ocean water (or a suitable alternative hydraulic fluid) into at least one storage chamber with a compressible air pocket, employing at least one float (responding to oscillatory wave motion) linked to at least one hydraulic ram (or alternative pressurizing device), the system being designed so that a multiplicity of these inventions may function concurrently in proximity to each other. The fluid in the chamber, when brought to a minimum threshold pressure by the float/ram mechanism, is released in a pressure-regulated stream that engages a hydraulically-operated turbine, which, because of the regulation, may directly produce properly governed alternating current suitable for release on standard power grids. Modified versions or configurations of the invention may also generate hydraulic pressure at a level suitable for purifying a portion of the ocean water in a storage chamber by reverse osmosis or other suitable means.

13 Claims, 3 Drawing Sheets

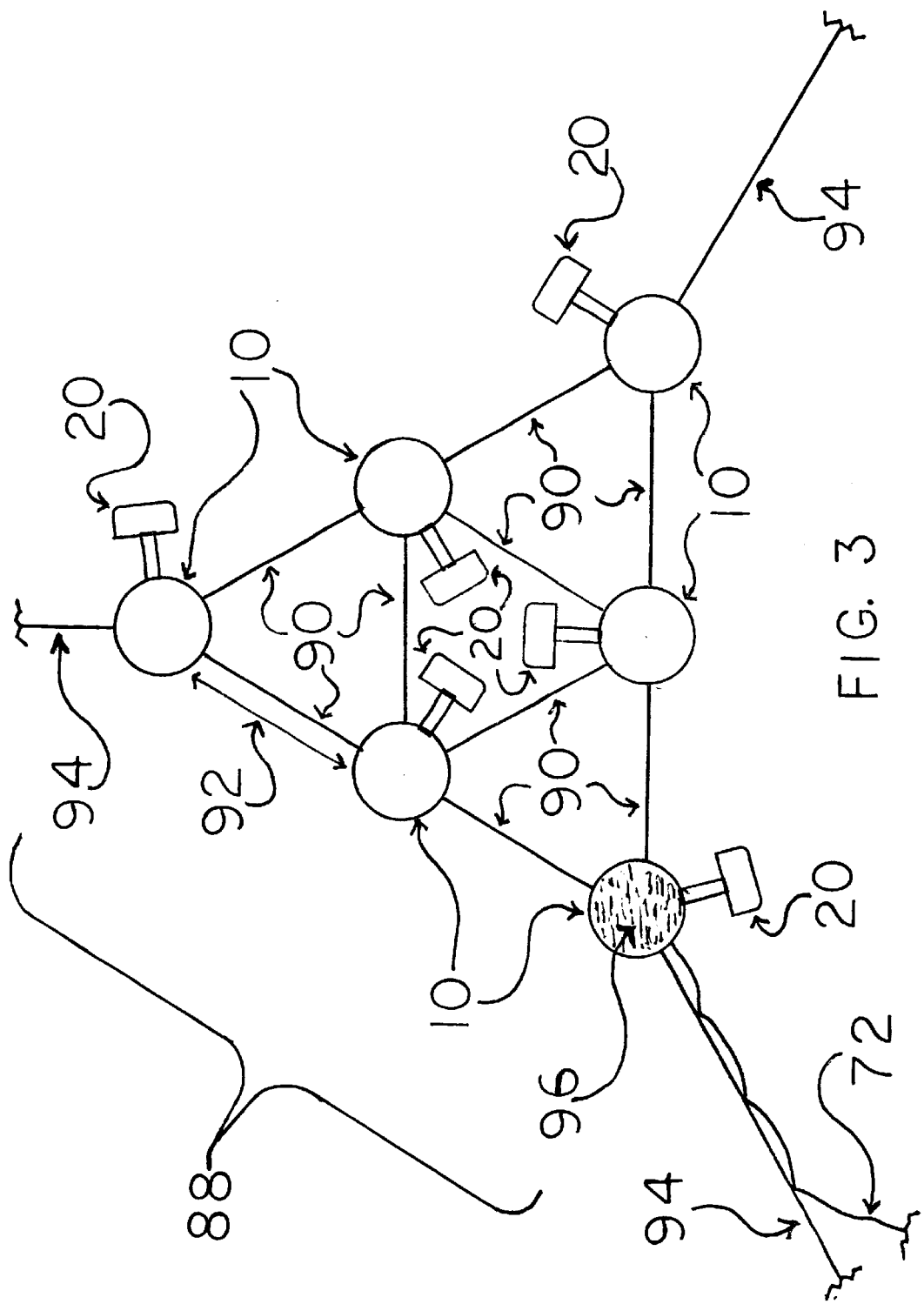

OCEAN WAVE POWER GENERATOR (A "MODULAR POWER-PRODUCING NETWORK")

This application claims the benefit of provisional application No. 60/210,578 filed Jun. 8, 2000.

BACKGROUND OF THE INVENTION

1. Field of the Invention

The disclosed invention relates generally to a means of generating useable electrical energy by ultimately employing the energy of moving waves on the surface of an open body of water.

2. Description of the Related Art

Several means have been invented for the purpose of converting wave energy into electrical energy, and these seem to fall into the following broad categories:

A. Devices which directly, or at least early in the process, convert the oscillating motion of the waves into rotational energy, which is then generally used to directly turn a generator. Examples of this category of inventions include: Shoreline installations, such as—Kumbatovic (U.S. Pat. No. 5,789,826, Aug. 4, 1998), which employs a flexible boom system to place a moveable turbine into the most active focal wave zone; or Brown (U.S. Pat. No. 5,808,368, Sep. 15, 1998), which places floats at the end of long shore-based lever arms that pivot in response to the vertical motion of the floats in the waves; or Buonome (U.S. Pat. No. 4,454,429, Jun. 12, 1984), which imposes a series of constrictions upon near-shore waters (which serve to amplify the wave action), and places floats between the constrictions, with lever arms on the shore in a manner reminiscent of Brown; or Hidenori, et. al. (U.S. Pat. No. 5,027,000, Jun. 25, 1991), which uses the, rising and falling of water in open-bottomed cylinders placed near shore to mildly compress large volumes of air and drive an air turbine; or Boyce (U.S. Pat. No. 4,748,338, May. 31, 1988) which utilizes a pontoon raft and a pyramidal framework to support a large pendulum, which oscillates as the raft tilts in the waves, ratcheting a drive shaft;

—and: Near shore installations with foundations on the shore bottom, such as—

Eberla (U.S. Pat. No. 5,986,349, May. 18, 1998; U.S. Pat. No. 4,206,601, Jun. 10, 1980), which utilizes a vertical pilaster and a toroidal float surrounding the pilaster to pressurize air or a fluid as the float moves up and down relative to the pilaster; or Youngblood (U.S. Pat. No. 5,359,229, Oct. 25, 1994), which employs a spherical float telescopically mounted to a secured vertical column, with a chain and counterweight, which turn a drive shaft as the float bobs; or Borgren (U.S. Pat. No. 4,241,579, Dec. 30, 1980), wherein a central support grounded on the ocean floor supports a multiplicity of shafts on which are anchored floats that engage the shaft while bobbing, thereby translating the energy to rotational energy; or Whitticar (U.S. Pat. No. 4,560,884, Dec. 24, 1985), which posits a stationary platform with a float connected to an air compressor, that delivers compressed air while bobbing;

—and: Open ocean craft, platforms, or largely submerged devices (that also could be located near-shore if desired, or that do not specify a location), such as—

Russo (U.S. Pat. No. 4,803,839, Feb. 14, 1989), which mounts a float on a raft and achieves a certain amount of bobbing motion of the float relative to the raft, and mechanically converts this to rotational energy, driving a generator; or Lamberti (U.S. Pat. No. 4,389,843, Jun. 26, 1983), which mounts floats on pivot arms from a boat, and using drive sprockets, gears, and clutches, converts this likewise to rotational motion in a generator; or Trepl and Bashardoust (U.S. Pat. No. 5,424,582, Jun. 13, 1995), which utilizes floats of different design and weight (to be responsive to both rising and falling phases of the wave) to drive a "constant speed" flywheel via mechanical linkages; or Sieber (U.S. Pat. No. 5,394,695, Mar. 17, 1995), which posits an array of floats attached to piston-type pressurization units, connected in series to serially compress a fluid (gas or liquid) to a high pressure to then drive turbines and generators; or Hyun (U.S. Pat. No. 5,854,516, Dec. 29, 1998) which employs a multiplicity of buoys suspended in an array in the ocean, where the bobbing motion of the buoys is converted to rotational energy, driving a liquid compression unit, and using the pressurized liquid to drive a turbine and generator; or Gordon (U.S. Pat. No. 4,781,023, Nov. 1, 1988), which employs a floating array of hinged floats whose motion relative to their support arms, or to their multiple segments, can drive a piston-type pressurizing device, producing "mechanical, hydraulic, or electrical power"; or Tateishi (U.S. Pat. No. 5,889,336, Mar. 30, 1999), which utilizes a float and a dead weight attached via a chain to convert to rotary motion, driving a generator; or Shim (U.S. Pat. No. 5,066,867, Nov 19, 1991), which uses ropes and gears attached to an array of bobbing floats to convert to rotational energy; or Windle (U.S. Pat. No. 4,754,157, Oct. 10, 1986) which employs a wave-actuated spring-loaded (or weight/tether) mechanism to drive a hydraulic pressurization device, yielding pressurized water to operate a hydraulic generator.

Most of the purely mechanical transducing devices suffer the limitation of unregulated rotational speed of the generator, rendering the output suitable only for non-critical current applications (usually the charging of batteries). To invert such output to a form suitable for the power grid requires an additional, inefficient step, rendering most of these devices impractical. Those that govern the rotational speed employing some kind of load control simply waste any energy produced in excess of the governed speed, again rendering them somewhat impractical.

The shoreline devices, additionally, are generally massive and ugly, and tend to disrupt the shoreline environment; and the near-shore inventions also pose some such additional visual and environmental problems.

The open ocean inventions that are boat-, raft-, or float-based will tend to dampen the surface waves because of their mass (as will those devices with large storage or generating facilities at or near the surface).

Those inventions that posit floats that are specially-designed or weighted, hinged, or otherwise encumbered are needlessly elaborate and generally more expensive than the within invention. In trying to optimize certain aspects of wave energy collection, their overall practicality is called into question. The floats of the within invention are simple, affordable, and responsive, being somewhat small relative to the wavelength of the average wave, and the overall simplicity of each power-producing module (if assembled into multiple arrays) allows easy maintenance, or module replacement, without taking the entire system down.

B. "Other" devices, which variously:

- use a pressure transducer on a surface below sea level to directly convert to electrical energy, which, again is DC in nature and must be inverted to be applied to the power grid; and pressure transducers have expense considerations inherent within them as well (such as North, U.S. Pat. No. 5,955,790, Mar. 13, 1998);
- collect ocean streaming energy, which is used to drive a turbine; but this suffers from uneven speed of flow (Williams, U.S. Pat. No. 5,592,816, Jan. 14, 1997);
- contain a "slider" or other mass, on floating rails or in a floating cylinder, that moves back and forth when its support tips due to wave motion, and interacts with some means of pressurizing a fluid or driving a mechanism, a device which seems to suffer from frictional and inertial dissipation (such as Rubi, U.S. Pat. No. 4,851,704, Jul. 25, 1989 or Stupakis, U.S. Pat. No. 4,843,250, Jun. 27, 1989);
- utilize wave action to move a permanent magnet past a coil and induce electrical current, which again would be sporadic in nature and suitable only for charging batteries or other electrical storage devices (as in Neuenschwander, U.S. Pat. No. 4,539,485, Sep. 3, 1985);
- employ a "liquid flywheel", or whirling vortex of water yielded from waves passing through a refractive horn and ramp, which drives a turbine; and again may produce energy in a pulsatile fashion (as in Wirt, U.S. Pat. No. 4,152,895, May. 8, 1979).

SUMMARY OF THE INVENTION

A major aspect of the disclosed invention (the "modular power-producing network", or "power net") is that it provides an efficient means of converting oscillatory ocean wave motion into governed alternating current suitable for connection into commercially provided 60-cycle, 110–120 volt power grids commonly in use throughout the country (and equally well convertible into other common standards in use throughout the world).

Of course, the "power net" can also perfectly well supply other standards of electrical power supply, such as 12-volt DC or other storage battery requirements.

A further attribute of the "power net" is that an optional modification thereto may be utilized directly to convert ocean water to fresh water using reverse osmosis or other suitable means.

A multiplicity of the pressure collection/chamber devices of the "power net" modules may be linked via pressure hoses so that large volumes of water under suitable regulated pressure may be collected together to operate a bank of generators (of same or different capacity), so that the most efficient number or size of generators may be engaged at any given moment to optimize power output.

The ability to compound the number of the various components of the "power net" into modular applications allows great design flexibility, permits rotational maintenance programs without taking the entire system out of operation, and accommodates add-on capacity.

The elegant simplicity of the several preferred embodiments of the invention permits the greatest possible utilization of existing commercially-available components, rendering the invention affordable. It is the unique compounding of the elements of the "power net" that comprises the invention.

Further attributes of the invention are elucidated within the description below.

The foregoing aspects, attributes and objects, and further, related aspects, attributes and objects, of this disclosed invention are illustrated in the preferred embodiments diagrammed in the accompanying drawings. These drawings are for purposes of illustration, and it is cautioned that departures from these drawings in materials, design, and specific construction may occur without departure from the concept of the present invention.

BRIEF DESCRIPTION OF THE DRAWINGS

FIG. 3 is a top view of an array of modules of the disclosed invention, showing its expandability. For simplicity, only one float is shown attached to each module, but in practice there would be several to many floats, depending upon module size and array configuration. All modules would collect and store ocean water (or other fluid) under pressure, but optionally, power conversion and generation equipment may be concentrated on one or a few of the modules (shown shaded).

DETAILED DESCRIPTION OF THE PREFERRED EMBODIMENT

Figure 1:
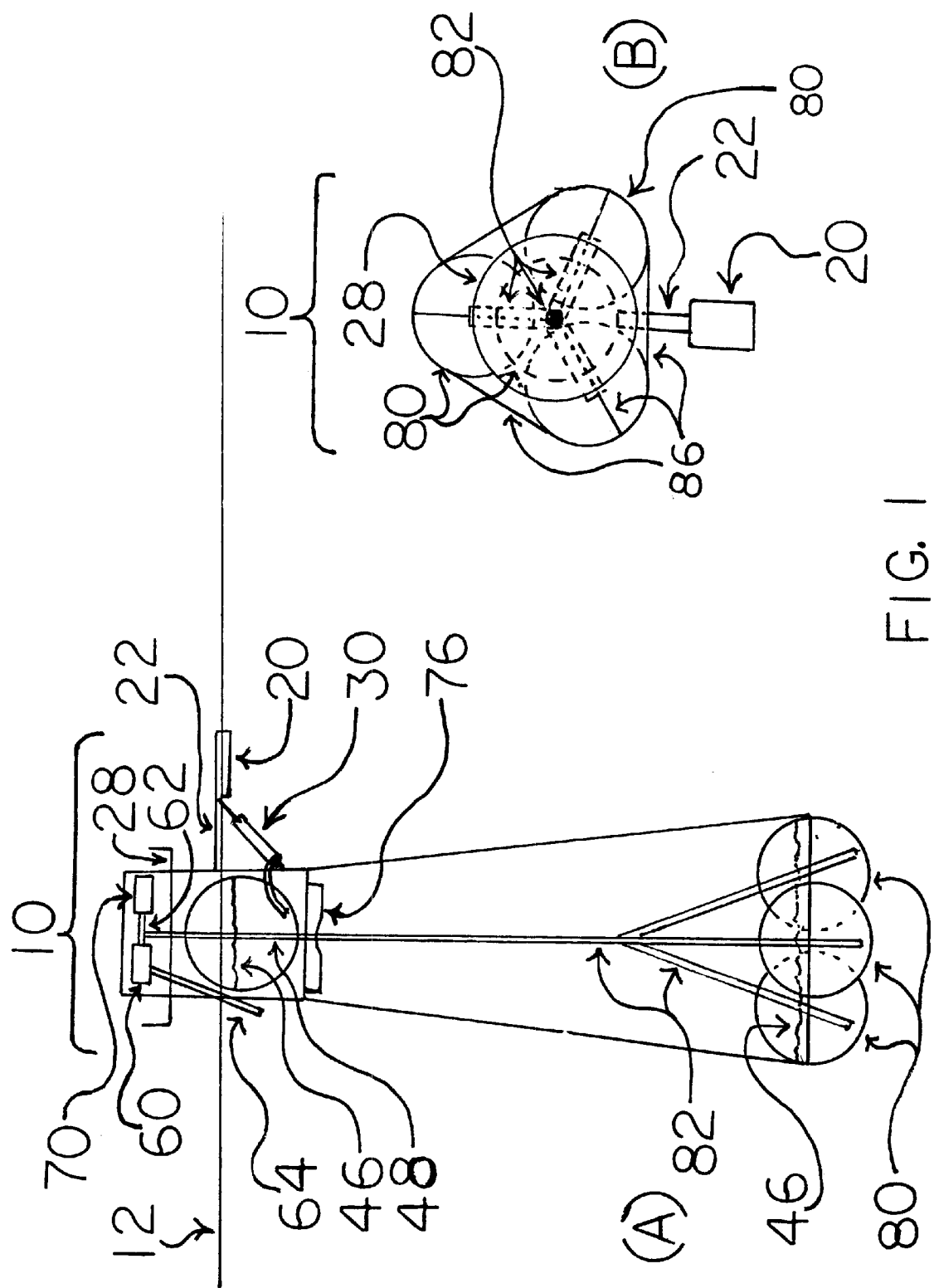
FIG. 1A is a side view of a simple embodiment of a single module of the disclosed invention, shown here with additional "add-on" optional supplemental storage tanks (dotted lines).
FIG. 1B: top view.
Figure 2:
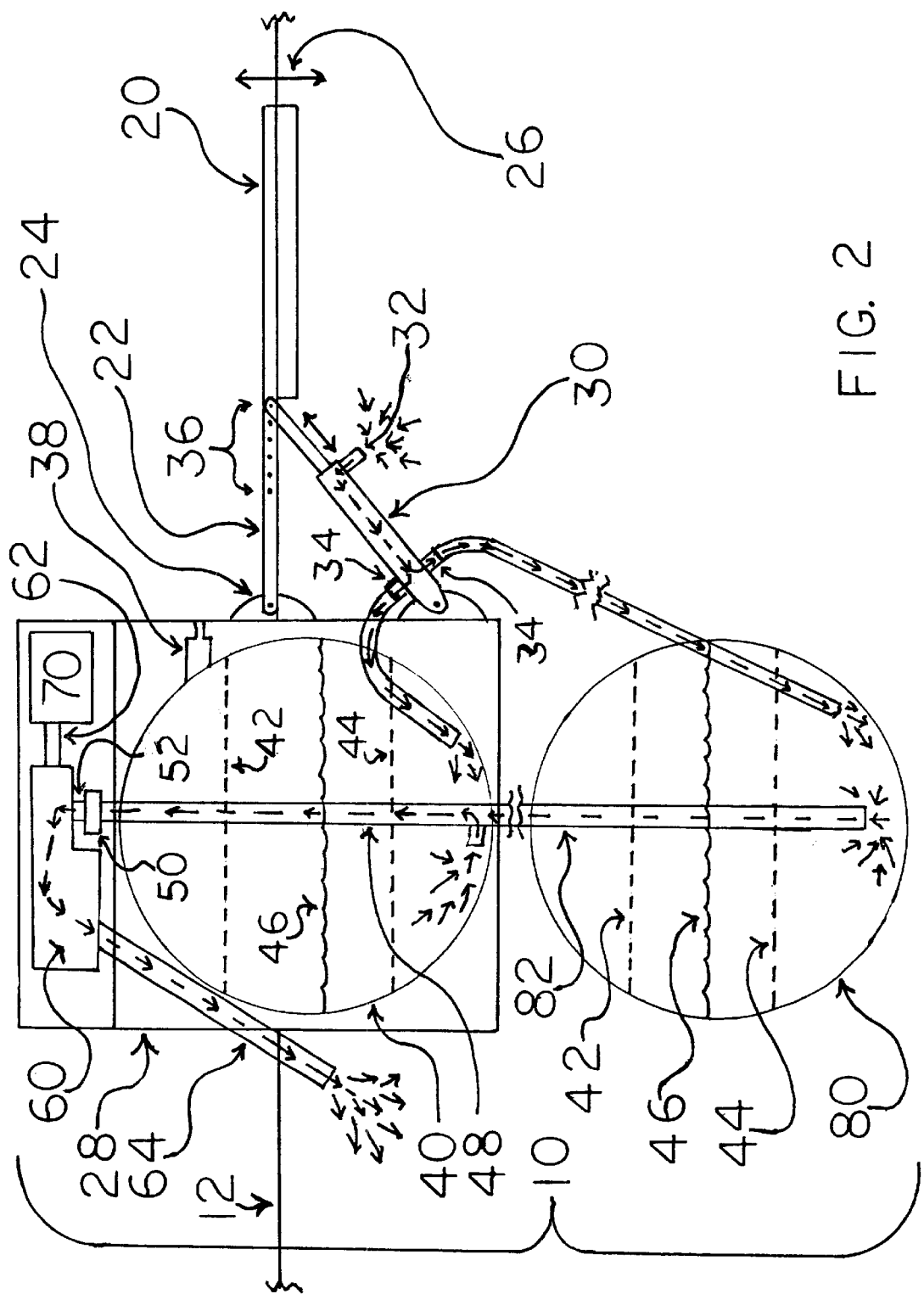
FIG. 2 is a sectional view of major components shown in FIG. 1.

FIGS. 1 and 2 illustrate a single module of the ocean wave power generator [10] ("Pwer Net") in a simplified embodiment for ease of description. The invention is shown floating mostly submerged below the surface [12] of the ocean, and for simplicity shows only a single float [20] affixed via a lever arm [22] to an upper framework [28] (which is shown in this embodiment as circular) at pivot point [24]. In practice, most embodiments of the invention would have multiple floats and lever arms, each with a hydraulic ram [30], anchored (with suitably strong hinged or pivoted attachments) to the framework [28] on one end, and the lever arm [22] on the other.

The wave motion [26] will move the float [20] and lever arm [22] about the pivot point [24], thereby driving a piston-type hydraulic pump or "ram" [30]. In this embodiment, the ram reloads ocean water through a one-way valve [32] when the float drops, and pumps water through a valved high-pressure line [34] into a pressure chamber [40] when the float rises. Other embodiments using alternative fluids could be constructed using a closed system, as opposed to the open system of the diagrammed embodiment.

The lever arm [22] may be made to be adjustable in length (not shown), so that the float's rise and fall may be most efficiently tuned to the average wave height in any area where the "Power Net" may be located. Alternatively, the lever arm length may be actively regulated via a servo-mechanism, so that the float excursion at any time is tuned to the most efficient water-pumping characteristics of the float/lever arm/water ram [20–24 and 30–36] system. This lever arm extension capability is one factor in the adjustability or "tuneability" of the ram(pumping) system; another is the ability to attach the ram [30] to the lever arm [22] employing a slidably adjustable pivot point [36], which also may be servo-controlled.

As water is pumped into the pressure chamber by the water ram [30], it compresses the air above it, until it reaches a minimum operating pressure at a certain level in the chamber (shown here at [44]). Typically operating at a mid-range pressure indicated by an intermediate amount of compression of the air pocket shown at water level [46], there is a pressure relief valve [38] which will come into play if the water level in pressure chamber [40] approaches a dangerously high level [42].

Additional pressure chamber(s) [80] may be connected to the invention well under water, a location which desirably serves to supply underwater ballast to the invention, stabilizing the upper framework [28] against wave motion and rendering the movements of the float more efficient in the capture of wave energy than would be the case if the invention were placed entirely at the surface of the water. Furthermore, placing a large part of the mass of the invention substantially below the surface reduces the damping effect of the device on the surficial wave motion, again increasing the efficiency of the capture of wave energy. The pressurized bodies of water within the pressure chambers [40, 80] are connected to each other via a riser tube network [82] which is perforated or terminated near the bottom of each chamber, in order to allow the conduction of the volumes of water (under pressure) generated by the hydraulic rams. An upward extension of the riser tube network [48] serves to conduct water under pressure from all the chambers to the top of the framework where the electrical generation capability is located.

Pressurized water from riser tube [48] reaches pressure regulator [50], shown here near the top of the framework [28], and is regulated to a constant pressure. It is conducted therefrom through pressure line [52] to drive a constant-speed water turbine [60], and then exits back into the open ocean through release conduit [64] (unless an alternative fluid is utilized in a closed system, in which case the fluid is conducted through a similar conduit back to the hydraulic ram's intake valve [32]; an intermediate fluid cooling step is interposed if needed).

The water turbine [60] communicates through a drive shaft or output shaft [62] with an electrical generator [70] which converts the constant speed of the turbine into regulated electrical output suitable for conveyance via an underwater cable [72] (shown, in FIG. 3) to shore (or to any other location where power is desired). Although only one turbine and generator are shown, a multiplicity thereof (perhaps of different sizes and capacities) may be installed, so that different amounts of electricity may be generated if different volumes of pressurized fluid are pumped through the invention as a result of the availability of different amounts of ocean wave energy.

A separate chamber [76] communicating through a small opening at the bottom with the ocean, and connected to an air pump through a tube at the top, serves as an automatic balance control device. As varying amounts of air are maintained in this chamber, the invention may be positioned properly relative to the ocean level [12] so that the float/lever arm/hydraulic ram system [20, 22, 30] will operate in its most efficient operating range.

A variant of this invention, operating at higher pressures, may be utilized to produce purified water from ocean water, by substituting a reverse osmosis device or other suitable purification equipment for the pressure regulator [50–52], turbine [60–64] and generator [70–72], with suitable modifications.

Looking now to FIG. 3, an array [88] consisting of a multiplicity of the "Power Net" units [10] are shown for the purpose of the generation of larger quantities of electricity. Each module [10] is secured to others with cables or lines [90], which in this embodiment also support pressure hoses that conduct the water generated under pressure at each module to the module (or modules) [96] that support the electrical generation equipment; the other modules [10] in this case simply being open frameworks [28] containing the water pressure generation and storage means [20–24, 30–36, 40–48, 76, and 80–82]. The "complete" module(s) [96] that contain the power generation equipment [50–52, 60–64, and 70–74, in addition to the above] contain a multiplicity of turbines and generators [60–64 and 70] so that under different wave conditions (that supply different amounts of wave energy) the maximum feasible amount of electrical energy may be generated at any time.

The array [88] is securely anchored with a sufficient number of mooring lines [94], so that an undersea power cable [72] may be safely run to shore or to any other location where electrical power is needed. Depending upon average ocean conditions in the area chosen for locating the array [88], the distance [92] between modules may require adjustment to provide peak efficiency.

LIST OF REFERENCE NUMBERS 10-one module of the "power net" ocean wave power generator
12-ocean water level
20-float chamber
22-float lever arm
24-pivot point
26-direction of motion of wave action
28-upper support framework
30-hydraulic ram
32-intake/one-way valve
34-high-pressure feeder line/one way valve
36-adjustability of ram potential
38-pressure relief valve
40-pressure chamber
42-water level at upper end of safe operation
44-water level at lower end of efficient operation
46-water level shown at mid-range, typical operating level
48-riser tube
50-pressure regulator
52-regulated secondary pressure line
60-water turbine
62-output shaft
64-water release conduit
70-generator
72-power cable to shore
76-automatic balance control device
80-secondary (additional, optional) pressure chamber
82-secondary pressure chamber riser tube
88-"power net" assembly or array
90-lines (with pressure hoses) securing modules to each other
92-represents minimum effective distance between modules
94-mooring lines
96-module with electrical generation equipment

I claim:

1. A composite or modular device or system for the purpose of extracting energy from ocean waves, initially in the form of pressurized fluid capable of transduction into electrical energy or useful work, comprised of:

one or more stable, structurally stiff framework member(s) or structure(s);

means of suspension of the composite device in ocean water;

one or more pressurizeable storage vessel(s) for fluid, containing a captive air pocket at the top of at least one of said vessels, capable of providing pressurized fluid to an energy transducer above water level including a generator or other means of transforming energy or performing work;

one or more lever arm(s) with one or more floats at their distal end(s), and hinged to one or more of the framework structure(s) at their proximal end(s);

one or more valved cylinder-and-piston type fluid displacement mechanism(s) or water ram(s);

means of conduction of the pressurized fluid between the water ram(s), the storage vessel(s), and one or more locations for transduction of be pressurized fluid into electrical energy, or used for other application(s), whether on or near the device or removed therefrom;

means of connecting the components of the device or system to each other;

means of generating electrical energy from the pressurized, stored fluid; and means of conducting energy generated, or other forms of energy generated, to the areas of use.

2. The device of claim 1 wherein said framework consists of one or more structure(s) built for the purpose of supporting and deploying the other components of the device and wherein the means of suspension of the device include ordinary flotation means like a boat or raft; or alternatively such means comprise several elements of the device—including air pockets in pressurizeable storage vessel(s), air or vacuum within the float(s), and/or one or more automatic buoyancy control(s), which are chamber(s) that communicate(s) at the bottom with the open ocean and have one or more means of pumping in or removing air from the top, so the ballast weight is variably controllable.

3. The member or structure of claim 2 wherein this component is a structure built to orient vertically with one or several pressurizeable storage tanks anchored thereto several fathoms in depth to both increase storage capacity and to provide a deep-ballast situation to stabilize the entire structure relative to surficial wave activity, wherein such structure is largely composed of large-gauge plumbing pipes to provide the structural elements and conduct compressed fluid between storage vessels, and cables deployed to stabilize the composite result both vertically and between deep-ballast storage vessels.

4. The device of claim 1 wherein one or more storage underwater vessel(s) are provided for the purpose of storing fluid pressurized by other component(s) of the device, which storage vessel(s) have a compression air pocket at the top of one or more of them—which air pocket is capable of pushing stored fluid with sufficient force to drive an electrical generator or other means of performing work located above sea level—and which vessels have plumbed openings for conducting the fluid in and out as desired, and openings for other devices including but not limited to pressure relief valve(s).

5. The storage vessels of clam 4 which are constructed as large as possible given the expected internal and external pressures, meaning spherical for greatest strength, but other shapes may also be used; and having openings thereto for conduction of fluids and the intursion of specific devices, to wit:

such storage vessel(s) designed to be located at or near the ocean's surface, having at least one intake aperture In the lower ⅓ of the vessel—i.e., under water; at least one exhaust aperture near the top for a "dipping tube" inserted into the vessel(s) ending in the lower portion of the vessel(s) for the removal of fluid under pressure; and at least one special-purpose aperture in the upper ⅓ of the vessel(s)—i.e., above water, for the insertion of a pressure relief valve, and/or an air bleeder and pump mechanism to control the air volume, and/or other sensor(s) or active equipment; and finally a hole in the bottom of the vessel(s) for communication with other storage vessel(s) designed to be at the bottom of the structure, if these additional vessels are employed in any specific embodiment;

such storage vessel(s) designed to be at the bottom of the structure several fathoms deep having at least one intake aperture near the top of the vessel(s) that can double as an exhaust aperture if fitted with a similar "dipping tube", and other apertures if desired.

6. The device of claim 1 wherein one or more pivoted lever arm(s) are provided that support one or more float(s) distally which capture the wave energy and convert it to vertical motion the lever arm; and which arm(s) also support one hinged anchor point of the piston-and-cylinder type water ram(s).

7. The lever arm(s) of claim 6 designed to be of variable length in certain embodiments by utilizing one or more slip joint(s), which joint(s) are powered by one or more motor(s) and controlled by one or more servo-mechanism(s) to automatically or semi-automatically shorten or extend the arm (s)' length depending upon the wave amplitude and/or other characteristics in the surrounding ocean in embodiments employing powered variable lever arms; and which arm(s) are pivotally attached to the framework element(s) of the device in a manner that is likewise slidably adjustable, with or without servo-control to vary the height of the pivot point(s) above the water and/or to change the angle of attachment of the lever arm(s) to the water ram(s), thereby tuning the action of the lever arm(s) to maximum power transduction under given situations, in embodiments of the invention that are tuneable.

8. The device of claim 1 wherein one or more piston-and-cylinder style fluid-displacement mechanism(s) with valves to control intake and exhaust of fluid, commonly called water ram(s), are attached at one end thereof to the lever arm(s) and at the other end thereof to the framework structure(s) so that movement between the lever arm and the framework, caused by wave action, drives the piston within the cylinder and displaces ocean water or other fluid into the means of conduction of the fluid communicating with the storage vessel(s), thereby increasing fluid volume and pressure in the system, unless volume and pressure are otherwise relieved.

9. The fluid-displacement mechanism(s), or water ram(s), of claim 8 wherein said water rams are pivotally attached between elements of the framework(s) and the lever arm(s) of the device, which attachments are slidably adjustable, with or without power and/or servo-mechanism control in tuneable embodiments, and are designed and positioned to provide their delivery stroke into the fluid collection system of the device when the lever arm(s) are pushed upward by the action of waves upon the float(s); but other additional water rams in certain embodiments provided in the opposite sense deliver fluid into the collection system as the lever arms are falling.

10. The device of claim 1 wherein means of conduction of pressurized fluid are provided in the form of pressure resistive semi-flexible or flexible lines and rigid pipes, designed to resist the pressure of fluid to be generated by the device, exceeding in strength the level of pressure that would begin to be relieved by safety provision(s) including pressure release valve(s); and where means of conduction are provided between the elements of the device, or where the pressurized fluid may be conducted away from the site of the device via a combination of flexible, semi-flexible, and/or static plumbing components.

11. The means of conducting of claim 10 in which semi-flexible or flexible hydraulic lines are provided to link the water ram(s)' output to the storage vessel(s)' input aperture(s), and dipping tubes into storage vessel(s) and structurally stiff pipes linking storage vessels in those embodiments with multiple storage vessels, are also provided; and hydraulic and/or plumbing lines are likewise provided to link the storage vessel(s)' dipping tubes to the means of electrical generation, if generation is to occur on site; and finally, plumbed means of conducting the stored fluid, using flexible or semi-flexible hydraulic lines in areas of anticipated motion, between modules of the device, and to the final use or transduction end-point(s) are also provided.

12. The device of claim 1 wherein the means of generating electricity is provided either off-site, or on the device or on some of the modules within an array of a multiplicity of modules of the device, and is comprised of one or more constant-speed water turbine(s) connected to electrical generators, wherein the revolution speed of the turbines, and, in turn, the generators, is tightly controlled via pressure regulation or other means so that standardized output for conduction directly onto standard land-based power grids is possible.

13. The device of claim 1 wherein a means of conducting transduced energy to the final site of use, a distribution point on an electrical grid, in the case of electrical energy, is provided; and is comprised of waterproof electrical conducting cables.

* * * * *